(12) United States Patent
Wu et al.

(10) Patent No.: US 7,450,791 B1
(45) Date of Patent: Nov. 11, 2008

(54) OPTIC CONTROL MODULE

(76) Inventors: Ching-Huei Wu, 10F, No. 88-8, Sec. 1, Kuang-Fu Road, San Chung City, Taipei Hsien (TW); Wei Chang, 10F, No. 88-8, Sec. 1, Kuang-Fu Road, San Chung City, Taipei Hsien (TW); Huan-Ying Lu, 10F, No. 88-8, Sec. 1, Kuang-Fu Road, San Chung City, Taipei Hsien (TW)

( * ) Notice: Subject to any disclaimer, the term of this patent is extended or adjusted under 35 U.S.C. 154(b) by 0 days.

(21) Appl. No.: 11/889,719

(22) Filed: Aug. 15, 2007

(30) Foreign Application Priority Data

Jun. 15, 2007 (TW) .............................. 96209841 U

(51) Int. Cl.
*G02B 6/26* (2006.01)
(52) U.S. Cl. ............................. 385/12; 385/14; 385/33
(58) Field of Classification Search .................. 385/12, 385/14, 38
See application file for complete search history.

(56) References Cited

U.S. PATENT DOCUMENTS

| | | | |
|---|---|---|---|
| 7,343,072 B2* | 3/2008 | Lee et al. ....................... 385/49 |
| 2005/0053331 A1* | 3/2005 | Zhang ........................ 385/33 |
| 2005/0187463 A1* | 8/2005 | Quistgaard et al. ........... 600/424 |
| 2006/0078256 A1* | 4/2006 | Lee et al. ....................... 385/33 |
| 2007/0040817 A1* | 2/2007 | Underwood et al. ......... 345/179 |
| 2007/0063969 A1* | 3/2007 | Wright ....................... 345/156 |
| 2007/0232874 A1* | 10/2007 | Ince ........................... 600/320 |

* cited by examiner

*Primary Examiner*—Frank G Font
*Assistant Examiner*—Eric Wong
(74) *Attorney, Agent, or Firm*—Apex Juris, pllc; Tracy M. Heims

(57) ABSTRACT

An optic control module includes a housing, a light source, an optic lens body, a detector, and a control circuit. The housing contains therein a circuit board in electrical connection with a plurality of terminal pins. The light source is mounted on the circuit board and is electrical connection with the terminal pins for providing light. The light, after transmitting, in sequence, through a first optic curved surface, a first inclined surface, and a second optic curved surface of the optic lens body, leave the optic lens body and is then reflected by an operative body located above the optic lens body to travel through a third recess and a third optic curved surface of the optic lens body to get back to the detector. The detector is arranged on the circuit board of the housing at a location below a second protrusion of the optic lens body to receive and process the reflected light. The control circuit is formed on the circuit board to receive a signal transmitted from the detector to control the operation of the optic control module. As such, a modularized optic control module is provided.

2 Claims, 6 Drawing Sheets

OPTIC CONTROL MODULE

BACKGROUND OF THE INVENTION

1. Field of the Invention

The present invention relates to an optic control module, and in particular to an optic control module that incorporates a combination of a housing, a light source, an optic lens body, a detector, and a control circuit, wherein a light generated by the light source is emitted through and further reflected back through the optic lens body to the detector and the control circuit supplies control signals to other application circuits to thereby realize a modularized optic control module that is applicable to for example a notebook, a computer mouse, and the likes.

2. The Related Arts

The most commonly known input devices of a computer include a keyboard and a computer mouse. The keyboard in most cases provide an input means of key stroking, while the computer mouse is used to control or move a cursor in a computer screen. With regard to the control/movement of the computer cursor, an early computer mouse makes use of the rotation of a roller mounted on the bottom of the mouse so that control/movement of the cursor is realized by variation of electrical resistance caused by the rotation of the roller. This is often referred to as a mechanical mouse. The mechanical mouse is later replaced by for example a touch pad, a pointer input device, and the likes.

The touch pad works in such a way that when a user's finger is put into touch with the pad, a variation in capacitance of the pad is induced and a control IC detects the variation of capacitance and converts the detection result into figures of coordinates, which are then applied to control positioning of the cursor on the screen. The pointer input device has a casing in which a lens set is fixed for reflecting change of image to generate corresponding electrical signals that are then used to control positioning of the cursor.

However, the touch pad currently available in the market is very sensitive, which leads to imprecise positioning. In addition, in long term use of the computer, the user often get sweating on the finger and this leads to deterioration of sensitivity of control over the cursor. Further, the touch pad is a pressure sensitive device, which is easy to malfunction if not being carefully maintained. The conventional way of repairing is simply replacing the whole touch pad assembly and this is expensive. As to the pointer input device, the lens set must be very precisely fixed in the casing with very limited positional tolerance and thus requires high manufacturing precision and thus high manufacturing costs. Thus, it is not a practical device for general consumers.

SUMMARY OF THE INVENTION

Therefore, an objective of the present invention is to provide an optic control module, which incorporates a combination of a housing, a light source, an optic lens body, a detector, and a control circuit, wherein a light generated by the light source is emitted through and further reflected back through the optic lens body to the detector and the control circuit supplies control signals to other application circuits to thereby realize a modularized optic control module that can be operated to allow a user to directly obtain an input signal through his or her hand or other operative object with enhance convenience of operation.

Another objective of the present invention is to provide an optic control module, wherein the optic lens body is mounted to a top of the housing to make the assembling of the optic control module to a device in a more simplified and precise manner to thereby suit for mass production with lowered cost and improved practicability.

A further objective of the present invention is to provide an optic control module that comprises a modularized arrangement of combining a light source, an optic lens body, a detector, and a control circuit in a housing to thereby allow the optic control module to be easily mounted and applied to various devices with enhanced practicability and convenience.

To realize the above objectives, in accordance with the present invention, an optic control module is provided, comprising a housing, a light source, an optic lens body, a detector, and a control circuit. The housing contains therein a circuit board in electrical connection with a plurality of terminal pins. The light source is mounted on the circuit board and is electrical connection with the terminal pins for providing light. The light, after transmitting, in sequence, through a first optic curved surface, a first inclined surface, and a second optic curved surface of the optic lens body, leave the optic lens body and is then reflected by an operative body located above the optic lens body to travel through a third recess and a third optic curved surface of the optic lens body to get back to the detector. The detector is arranged on the circuit board of the housing at a location below a second protrusion of the optic lens body to receive and process the reflected light. The control circuit is formed on the circuit board to receive a signal transmitted from the detector to control the operation of the optic control module. As such, a modularized optic control module is provided.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENT

Figure 1:
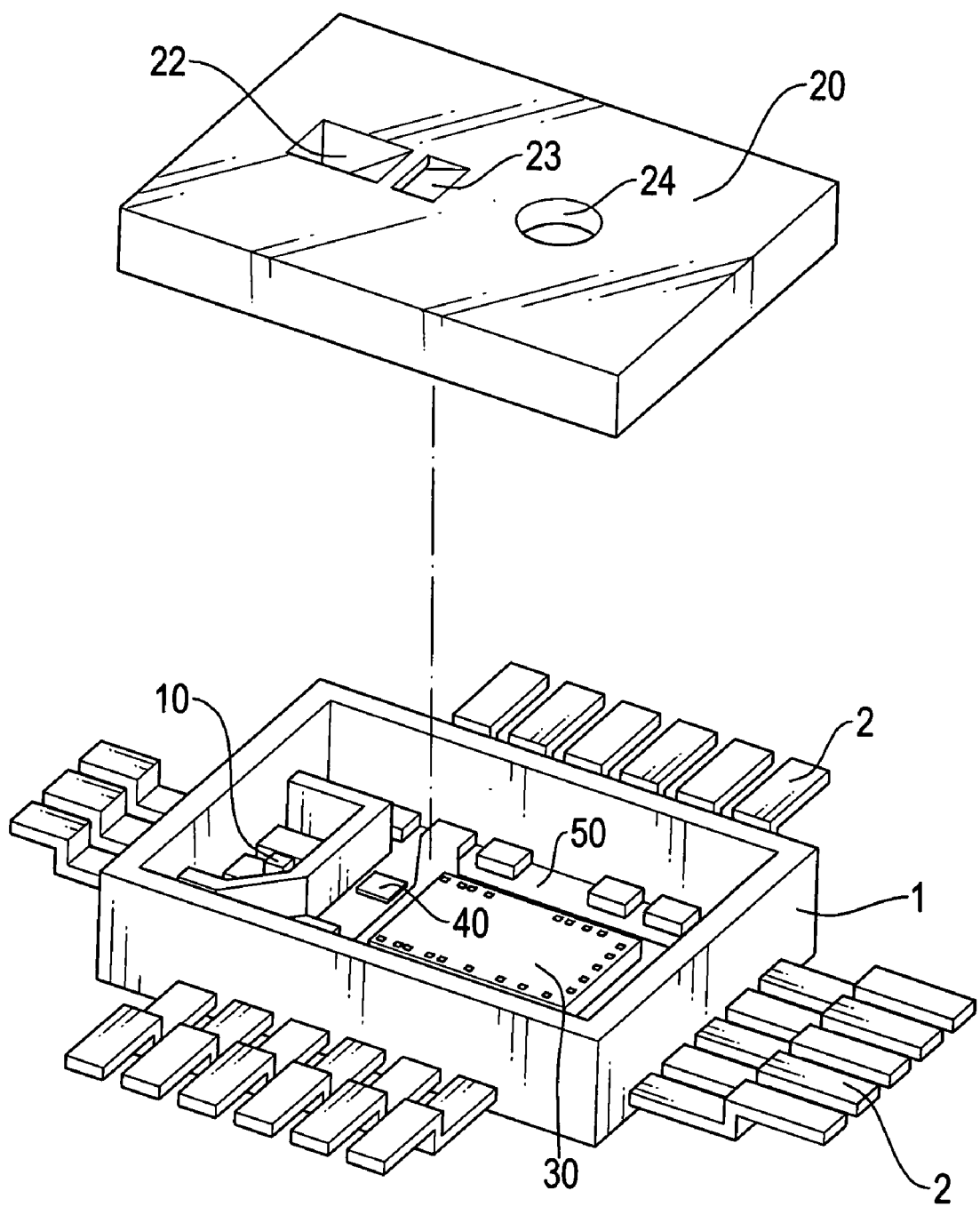
FIG. 1 is an exploded view of an optic control module in accordance with the present invention.
Figure 2:
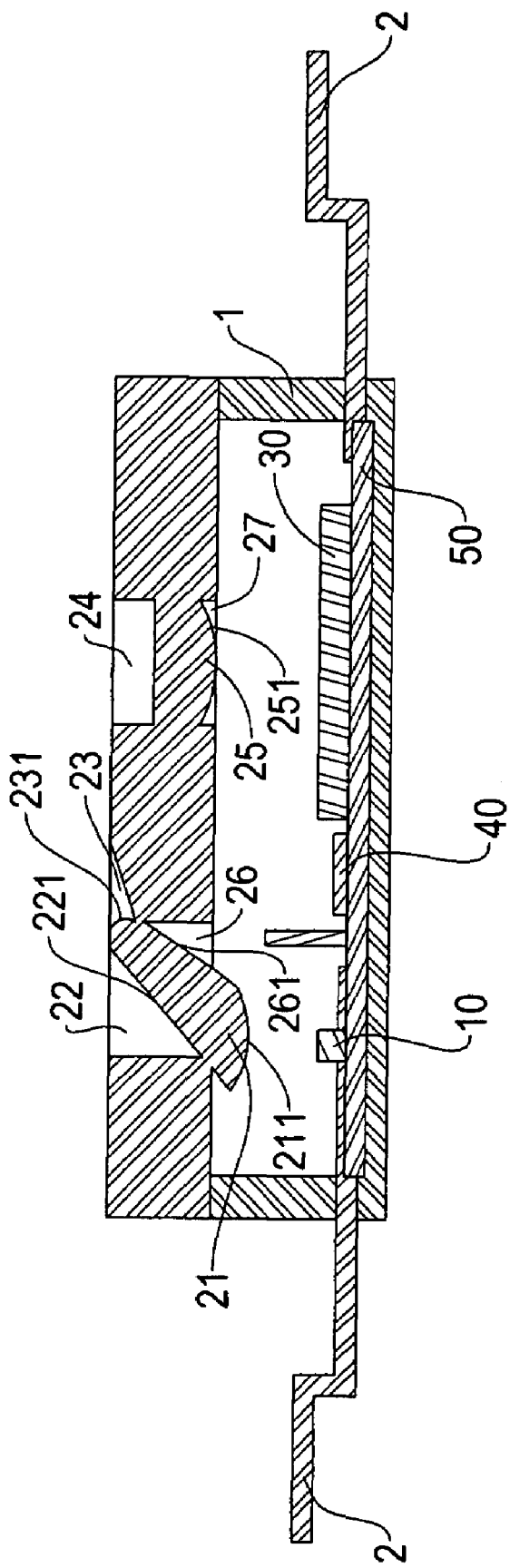
FIG. 2 is a cross-sectional view of the optic control module in accordance with the present invention.
Figure 3:
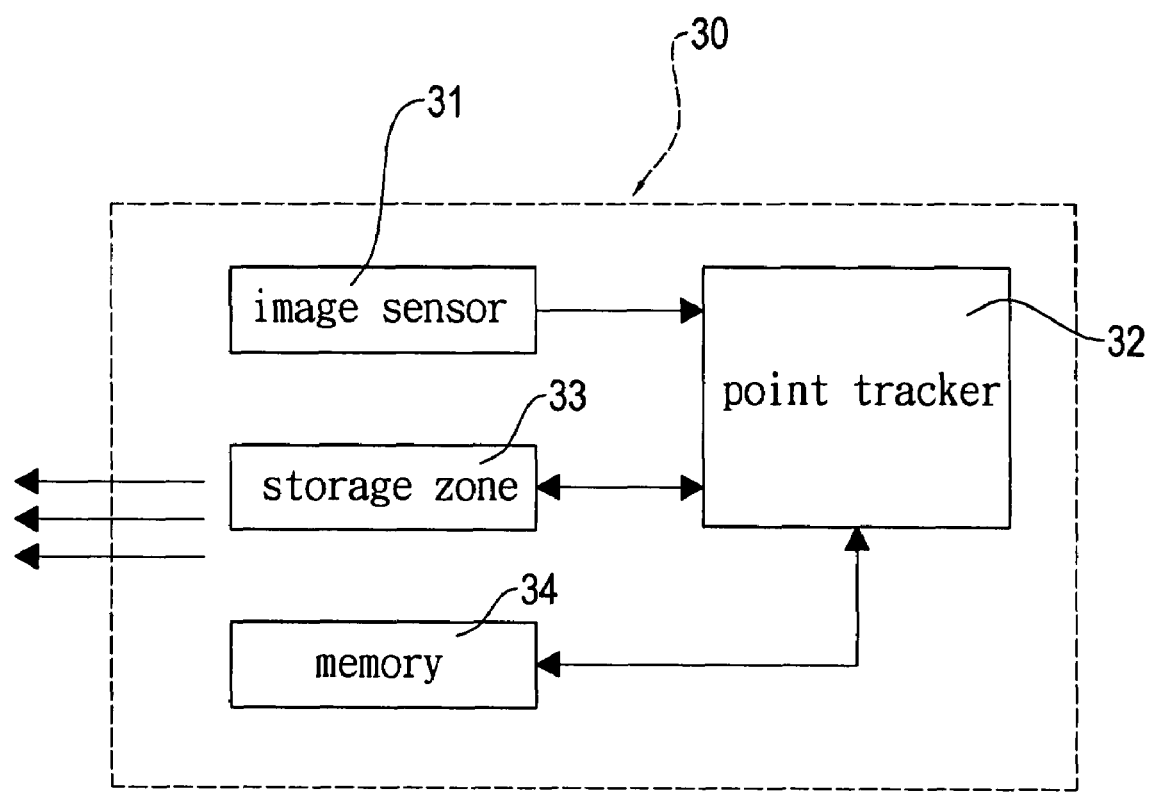
FIG. 3 is a circuit block diagram of a detector of the optic control module in accordance with the present invention.
Figure 4:
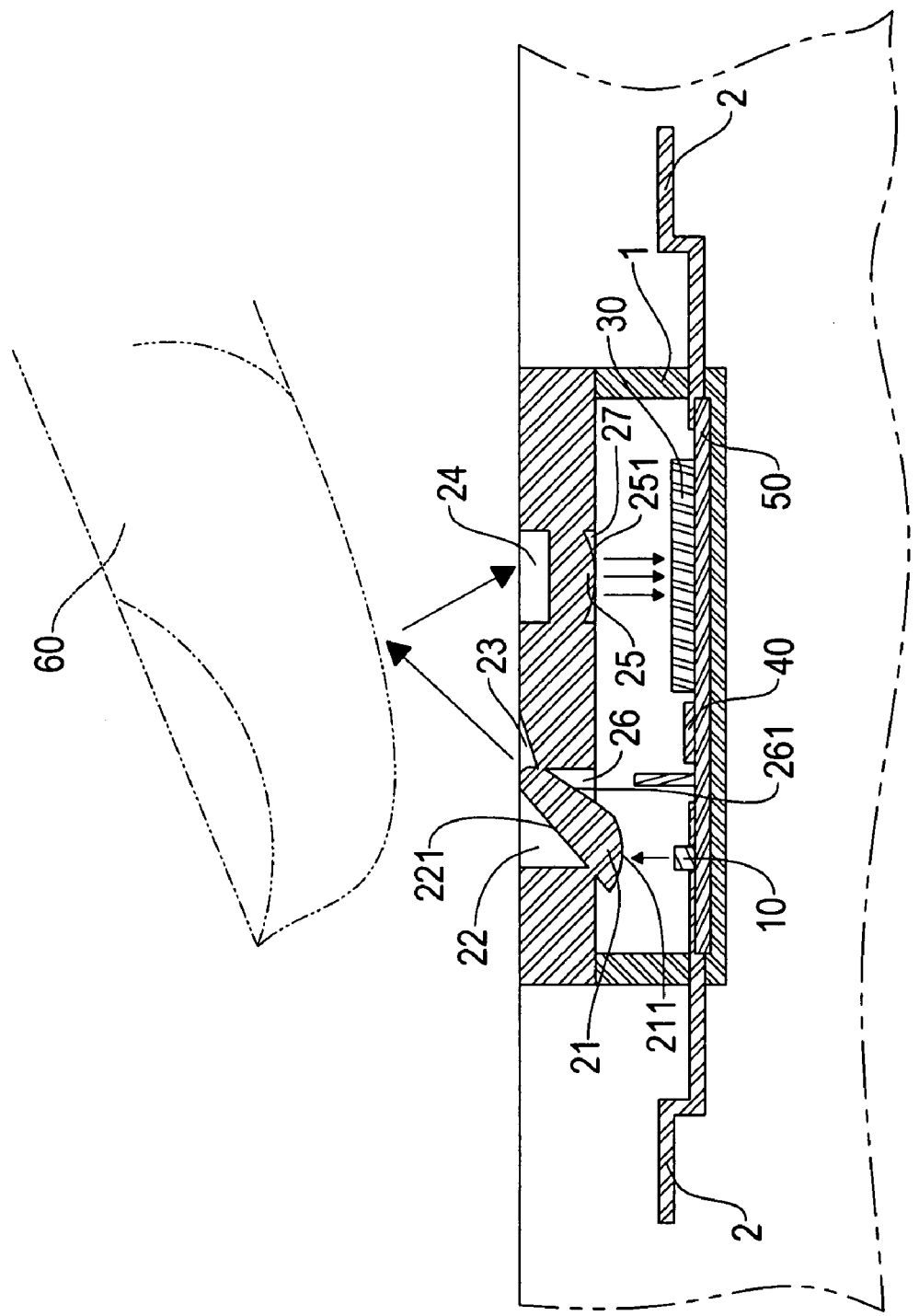
FIG. 4 is a cross-sectional view illustrating operation of the optic control module of the present invention.

With reference to the drawings and in particular to FIGS. 1-3, an optic control module constructed in accordance with the present invention comprises a housing 1 inside which a circuit board 50 is fixed. A plurality of terminal pins 2 is fixed to and extends into the housing 1 to electrically connect to the circuit board 50. A light source 10 is arranged inside the housing 1 and mounted on the circuit board 50. The light source 10 is electrically connected to the terminal pins 2 of the housing 1 to provide lighting.

An optic lens body 20 is mounted to a top side of the housing 1. The optic lens body 20 comprises, on a bottom thereof, a first protrusion 21 that forms a first optic curved surface 211 and a first recess 22 formed in a top of the optic lens body 20 above the first protrusion 21. Inside the first recess 22, a first inclined surface 221 is formed. The optic lens body 20 also forms, in the top thereof, a second recess 23 that is located at right side of the first recess 22 as viewed in Figure and a second optic curved surface 231 is formed in the second recess 23. The optic lens body 20 also forms in the bottom thereof a fourth recess 26 that is below a portion between the first protrusion 21 and the second recess 23. In the fourth recess 26, a second inclined surface 261 is formed. The optic lens body 20 further forms a third recess 24 in the top thereof, and a fifth recess 27 is formed in the bottom of the optic lens body 20 below the third recess 24. Inside the fifth recess 27, a second protrusion 25 is formed and the second protrusion 25 forms a third optic curved surface 251.

A detector 30 is mounted on the circuit board 50 inside the housing 1 and is located substantially below the second protrusion 25. The detector 30 comprises a complementary metal oxide semiconductor (CMOS) device for receiving light that transmits through the optic lens body 20 and is reflected and for carrying subsequent processing of the received optic signal. The detector 30 comprises an image sensor 31, a point tracker 32, a storage zone 33, and a memory 34.

A control circuit 40 is formed on the circuit board 50 inside the housing 1. The control circuit 40 receives a signal from the detector 30 to control the operation of the optic control module.

As shown in FIGS. 1-4, the optic control module of the present invention features a combination of the housing 1, the light source 10, the optic lens body 20, the detector 30, and the control circuit, wherein light generated by the light source 10 transmits through the optic lens body 20 and is then reflected by an operative object 60, such as a user's finger or other operative objects, to travel back to the detector 30. By means of selective electrical connection of the terminal pins 2 of the housing 1 with external application circuits (not shown), the control circuit 40 supplies signals to the external application circuits to allow the user to use his or her finger or other operative objects to simply obtain an input signal with enhanced convenience of operation. The optic lens body 2 that is mounted on the top of the housing 1 allows simplification and improved precision of assembling and manufacturing of the optic control module of the present invention, thereby suitable for mass production. Further, with the circuit board 50 arranged inside the housing 1 and a modularized arrangement of the light source 10, the detector 30, and the control circuit 40 on the circuit board 50, the light emitted from the light source 10 first transmits through the first optic curved surface 211 of the optic lens body 20, guided to the first inclined surface 221 by which the light is reflected to the second optic curved surface 231 through which the light exits the optic lens body 20; the second inclined surface 261 functions to reflect a portion of the light that has been subjected to reflection by the first inclined surface 221 toward the second optic curved surface 231 through which the light exits the optic lens body 20. The light leaving the optic lens body 20 is reflected by the operative object 60 and travels back through the third recess 24 and is then focused by the third optic curved surface 251 onto the image sensor 31 of the detector 30.

The image sensor 31 receives and processes the reflected light and generates a digital signal that is applied to the point tracker 32 for analysis and detection of moving direction of the operative object 60; and the point tracker 32 stores the signal in the memory 34 and the storage zone 33 and issues instructions to the control circuit 40 whereby the result of processing through the detector 30 is transmitted to the control circuit 40 by which the signal is applied to the external application circuits through the electrical connection of the terminal pins 2 of the housing 1 to the external application circuits. Thus, a simply-constructed and low-cost modularized optic control module is provided.

Figure 5:
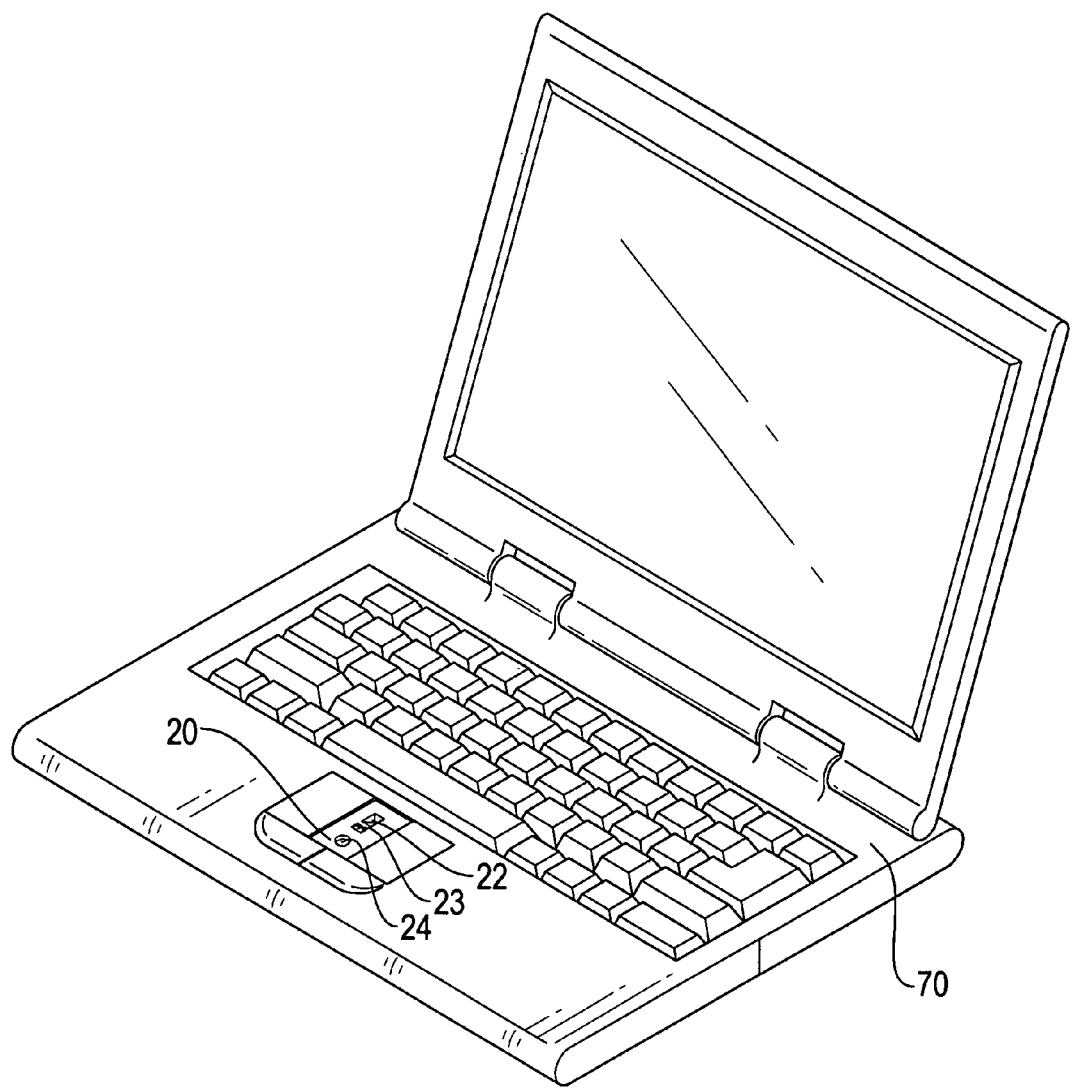
FIG. 5 is a perspective view illustrating an application of the optic control module of the present invention wherein the optic control module is mounted to a notebook computer.
Figure 6:
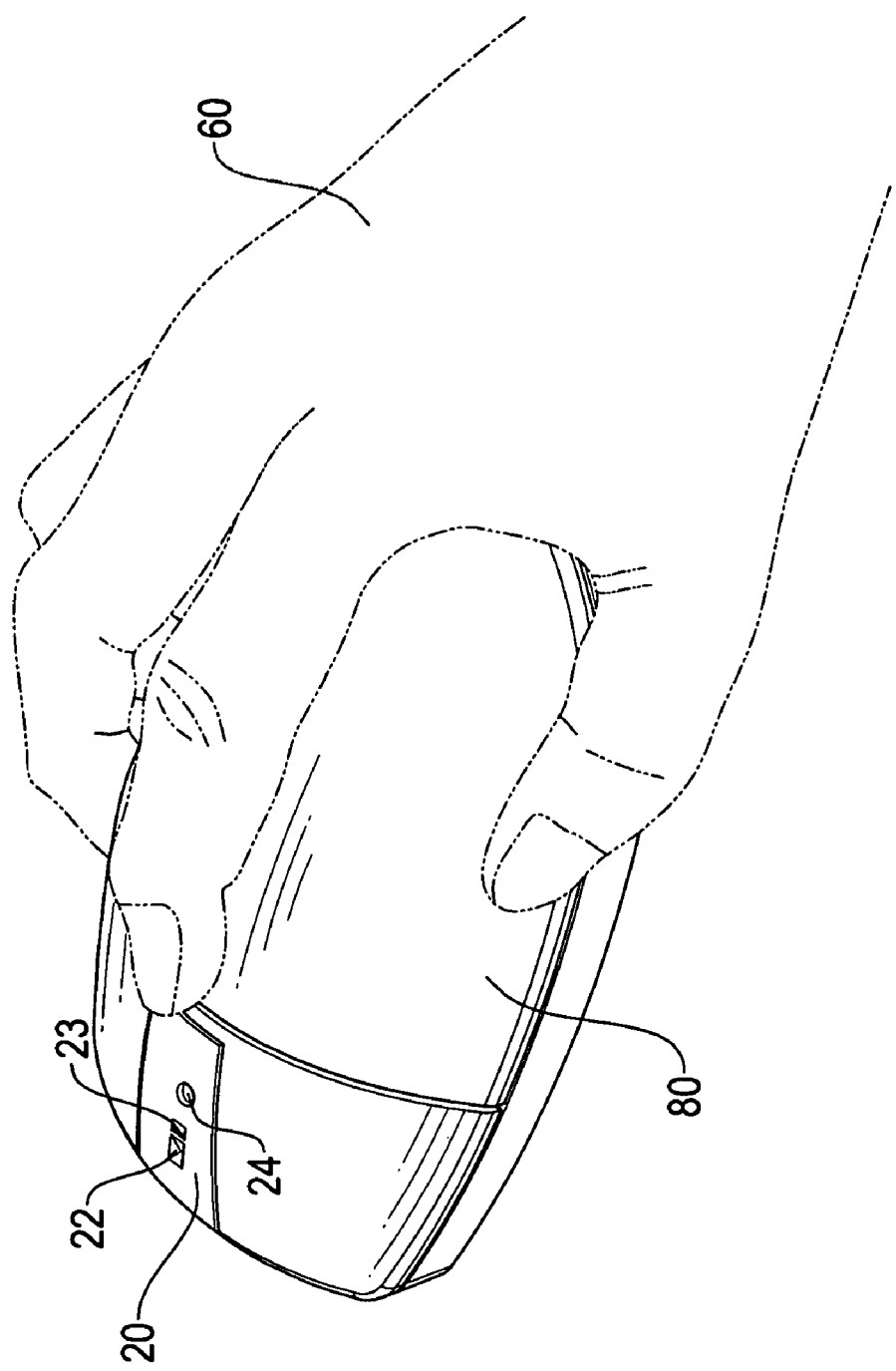
FIG. 6 is a perspective view illustrating another application of the optic control module of the present invention wherein the optic control module is mounted to a computer mouse.

Referring to FIGS. 1-6, an application of the optic control module of the present invention is illustrated in FIG. 5, in which the optic control module is mounted to a cavity (not labeled) defined in a device 70, which is a notebook computer taken as an example for explanation. The optic lens body 20 is mounted at the top opening of the cavity of the device 70 so that the first recess 22, the second recess 23, and the third recess 24 of the optic lens body 2 is observable on the device 70. The optic control module of the present invention, as embedded in the device 70, is electrically connected to the device 70 by means of the terminal pins 2 of the housing 1 to thereby function as an input device for the device 70. To operate, an operative object, such as a user's hand, is directly positioned on the input device (that is the lens optic body 20) of the device 70 to reflect back the light emitted through the optic lens body 20 so that the reflected light travels back through the optic lens body 20 and is eventually received by the detector 30. The received light is then processed by the CMOS device and applied to the control circuit 40 for controlling application circuits contained in the device 70. FIG. 6 illustrates another application of the optic control module of the present invention, wherein the optic control module is incorporated in a computer mouse 80 in such a way that the optic lens body 20 is mounted on a top face of the mouse 80 and the terminal pins 2 of the housing 1 are in electrical connection with the mouse 80 so as to function as an input device of the mouse 80. To conclude, the optic control module of the present invention that uses the reflection effected by the optic lens body 20 and conversion of the reflected light or optic signal into electrical signals for output provides a high-precision, fast-response input measure. Further, the present invention provides a modularized optic control module that can be easily incorporated in other devices in a simply-constructed and low-cost manner so as to provide excellent practicability and convenience of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An optic control module, comprising:
a housing in which a circuit board is contained, the housing comprising a plurality of terminal pins that is in electrical connection with the circuit board;
a light source mounted on the circuit board inside the housing, the light source being in electrical connection with the terminal pins of the housing to selectively provide light;
an optic lens body mounted to a top of the housing, the optic lens body comprising a first protrusion that forms a first optic curved surface, a first recess formed above the first protrusion, a first inclined surface formed inside the first recess, a second recess formed on a right side of the first recess and forming a second optic curved surface, a fourth recess being formed on a bottom of the optic lens body at a location below and between the first protrusion and the second recess, the fourth recess forming a second inclined surface, the optic lens body further forming a third recess, the bottom of the optic lens body forming a fifth recess below the third recess, the fifth recess forming therein a second protrusion that forms a third optic curved surface;

a detector mounted on the circuit board at a location below the second protrusion of the optic lens body for receiving and processing light; and a control circuit formed on the circuit board of the housing for receiving a signal from the detector to control operation of the optic control module, whereby a modularized optic control module is provided.

2. The optic control module as claimed in claim 1, wherein the detector comprises a complementary metal oxide semiconductor device.

\* \* \* \* \*